United States Patent
Suzuki et al.

(10) Patent No.: US 6,720,375 B2
(45) Date of Patent: Apr. 13, 2004

(54) ADHESIVE COMPOSITION AND ADHESIVE OPTICAL COMPONENT USING THE COMPOSITION

(75) Inventors: Takashi Suzuki, Kani (JP); Kenji Sato, Urawa (JP); Kazuhiro Kon, Kasukabe (JP); Toshio Sugizaki, Omiya (JP)

(73) Assignee: Lintec Corporation, Tokyo (JP)

( * ) Notice: Subject to any disclaimer, the term of this patent is extended or adjusted under 35 U.S.C. 154(b) by 263 days.

(21) Appl. No.: 09/829,061

(22) Filed: Apr. 9, 2001

(65) Prior Publication Data

US 2001/0041763 A1 Nov. 15, 2001

(30) Foreign Application Priority Data

Apr. 13, 2000 (JP) ........................... 2000-111672
Jul. 18, 2000 (JP) ........................... 2000-217118

(51) Int. Cl.$^7$ ................................. C08K 5/13
(52) U.S. Cl. ................... 524/349; 524/323; 524/324; 524/325; 524/351; 524/352; 524/353
(58) Field of Search ................ 524/323–325, 524/349, 353, 351, 352, 350

(56) References Cited

U.S. PATENT DOCUMENTS

| | | | | |
|---|---|---|---|---|
| 4,033,918 A | * | 7/1977 | Hauber | 524/296 |
| 4,418,120 A | * | 11/1983 | Kealy et al. | 428/343 |
| 4,492,724 A | * | 1/1985 | Allbright et al. | 428/40.9 |
| 4,569,960 A | * | 2/1986 | Blake | 524/145 |
| 5,279,896 A | * | 1/1994 | Tokunaga et al. | 428/355 AC |
| 5,331,040 A | * | 7/1994 | Lee | 524/522 |
| 5,424,122 A | * | 6/1995 | Crandall et al. | 428/355 CN |
| 5,623,014 A | * | 4/1997 | Bauer et al. | 524/543 |
| 5,629,365 A | * | 5/1997 | Razavi | 524/37 |
| 2001/0031835 A1 | | 10/2001 | Ohrui et al. | |

FOREIGN PATENT DOCUMENTS

| | | |
|---|---|---|
| EP | 0 761 788 A1 | 3/1997 |
| JP | 59 111114 A | 6/1984 |
| JP | 4 254803 A | 9/1992 |

OTHER PUBLICATIONS

"Encyclopedia of Polymer Science and Engineering", vol. 2, pp. 75–78, (1984), Wiley Interscience Publishers, New York.
U.S. patent application Ser. No. 09/805,088, Tomoo Ohrui et al.

* cited by examiner

Primary Examiner—Peter Szekely
(74) Attorney, Agent, or Firm—Frishauf, Holtz, Goodman & Chick, P.C.

(57) ABSTRACT

An adhesive composition comprising a crosslinked product of (A) a copolymer of (meth)acrylic esters and (B) a crosslinking agent, and (C) a phenol derivative. An adhesive composition comprising a crosslinked product of (D) a copolymer of (meth)acrylic esters having a weight-average molecular weight of 500,000 to 2,500,000 or (D') a mixture of the copolymer (D) and an oligomer of (meth)acrylic esters having a weight-average molecular weight of 1,000 to 10,000 in a ratio of amounts of 100:5 to 100:100 by weight and (E) a crosslinking agent, and (F) a radical scavenger. An adhesive optical component comprising a layer of the adhesive composition disposed on at least one face of an optical component. The adhesive composition serves to suppress degradation of easily hydrolyzable materials by hydrolysis, improve durability and provide excellent stress relaxation without plasticizers.

15 Claims, 1 Drawing Sheet

Fig.1

ADHESIVE COMPOSITION AND ADHESIVE OPTICAL COMPONENT USING THE COMPOSITION

BACKGROUND OF THE INVENTION

1. Field of the Invention

The present invention relates to an adhesive composition and an adhesive optical component using the adhesive composition. More particularly, the present invention relates to an adhesive composition which, by application to easily hydrolyzable materials such as substrates and adherends, suppresses degradation of the materials by hydrolysis and improves durability of the materials; an adhesive composition which provides excellent stress relaxation without plasticizers, suppresses degradation of easily hydrolyzable materials such as substrates and adherends by hydrolysis by application to the material, suppresses degradation of the composition itself and gives adhesive optical components having excellent quality; and an adhesive optical component comprising the adhesive composition such as a polarizing plate and a plate for phase differentiation.

2. Description of Related Art

As the adhesive, acrylic adhesives, polyurethane adhesives, polyester adhesives, rubber adhesives and silicone adhesives have heretofore been used. Among these adhesives, acrylic adhesives are widely used. An acrylic adhesive contains, in general, a copolymer of (meth)acrylic esters and a crosslinking agent. As the copolymer of (meth) acrylic esters, for example, a copolymer of a (meth)acrylic ester such as butyl (meth)acrylate, 2-ethylhexyl (meth) acrylate, isooctyl (meth)acrylate and decyl (meth)acrylate with a functional monomer for forming crosslinking points is used. The functional monomer is, specifically, a functional monomer having hydroxyl group such as hydroxyethyl (meth)acrylate and hydroxypropyl (meth)acrylate or a functional monomer having carboxyl group such as (meth) acrylic acid, maleic acid, crotonic and itaconic acid.

However, when the acrylic adhesive is applied to a material which is easily hydrolyzed such as films of cellulose acetate, a problem arises in that the material tends to be hydrolyzed due to the effect of carboxyl group in the copolymer of (meth)acrylic esters contained in the acrylic adhesive. The degradation of the material by hydrolysis takes place markedly, in particular, under an environment of a high temperature and high humidity.

Some optical components are used after a polarizing plate is attached to the surface. Typical examples of such optical components include liquid crystal cells in liquid crystal displays (LCD). In general, a liquid crystal cell has a structure in which two transparent electrode substrates having an oriented layer are placed in a manner such that a specific gap is formed between them with a spacer and the oriented layers face to each other at the inside, peripheral portions of the transparent electrode substrates are sealed, a liquid crystalline material is placed and held inside the gap between the transparent electrode substrates and a polarizing plate is disposed on each outer surface of the two transparent electrode substrates via an adhesive layer.

Figure 1:
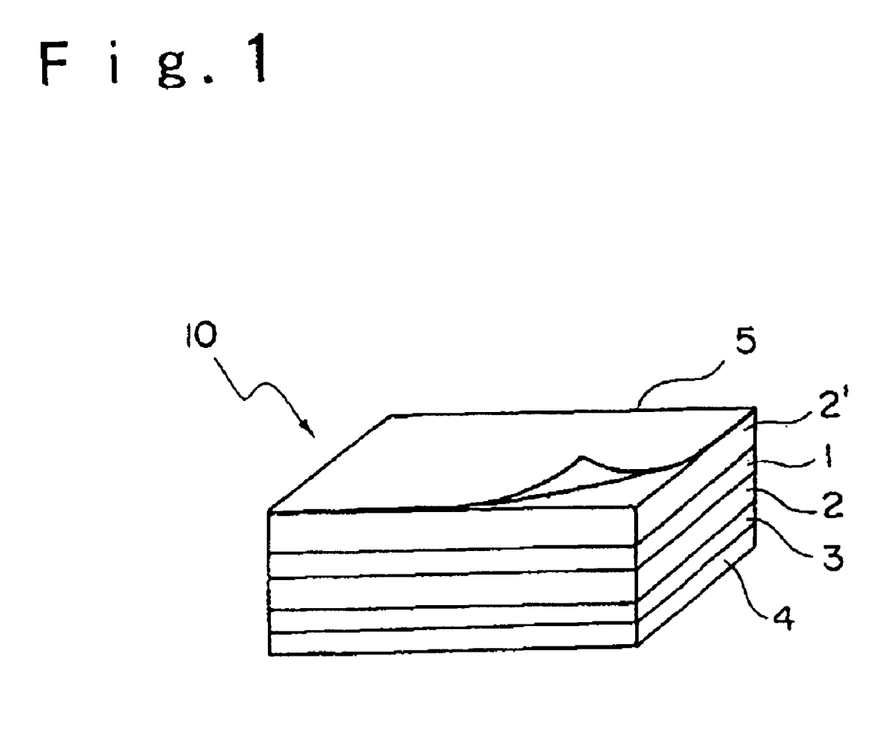
FIG. 1 shows a perspective view exhibiting the structure of an example of a polarizing plate.

FIG. 1 shows a perspective view exhibiting the structure of an example of the polarizing plate described above. As shown in FIG. 1, the polarizing plate 10 has a substrate having a three-layer structure in which triacetylcellulose (TAC) film I 2 and TAC film II 2' are laminated on the faces of a polarizing plate 1 made of polyvinyl alcohol. On one face of the substrate, an adhesive layer 3 for sticking the substrate to an optical component such as a liquid crystal cell is formed. A release sheet 4 is attached to the adhesive layer 3. In general, a film for protecting the surface 5 is disposed on the face of the polarizing plate opposite to the face having the adhesive layer 3.

When the above polarizing plate is attached to the above liquid crystal cell, the release sheet 4 is removed first, then the polarizing plate is stuck to the liquid crystal cell via the exposed adhesive layer and the film for protecting the surface 5 is removed.

For the adhesive layer disposed on the polarizing plate, acrylic adhesives are widely used. However, as described above, the acrylic adhesive promotes hydrolysis of the TAC film of the polarizing plate due to the effect of carboxyl group in the copolymer of (meth)acrylic esters and the polarizing plate is degraded. The degradation of the polarizing plate takes place markedly, in particular, under an environment of a high temperature and a high humidity.

In liquid crystal display apparatuses of the STN type, it is widely conducted that a plate for phase differentiation is disposed between a liquid crystal cell and a polarizing plate. As the plate for phase differentiation, in general, a laminate having a TAC film on one or both faces of a stretched film of polyvinyl alcohol and a layer of an acrylic adhesive on the face of the TAC film, is used. An liquid crystal cell is formed by laminating one or a plurality of plates for phase differentiation to an STN cell via the above adhesive layer and then laminating a polarizing plate on the outermost layers. The thus prepared liquid crystal cell also has a problem in that degradation of the TAC film by hydrolysis takes place in the plate for phase differentiation similarly to the degradation of the TAC film in the polarizing plate.

To overcome the above problems, for example, a method in which the amount of carboxyl group contained in the adhesive is decreased (Japanese Patent Application Laid-Open No. Showa 59(1984)-111114) and a method in which a tertiary amine is added (Japanese Patent Application Laid-Open No. Heisei 4(1992)-254803) have been proposed. However, the method in which the amount of carboxyl group is decreased has a drawback in that the excellent balance between the physical properties of the adhesive is inevitably lost and the method in which a tertiary amine is added has a drawback in that the pot life of the adhesive decreases since control of the reactions between a crosslinking agent and various functional groups in the adhesive becomes difficult and workability in various steps deteriorates.

The polarizing plate which is attached to the liquid crystal cell via the adhesive layer has the three-layer structure described above. Due to the properties of the materials, the polarizing plate has poor dimensional stability and, in particular, change in the dimension by contraction or expansion is great in the environment of a high temperature or a high temperature and a high humidity.

However, since, in general, an adhesive having a great adhesive ability is used in the above polarizing plate, stress caused by the change in the dimension of the polarizing plate cannot be absorbed and relaxed by the adhesive layer although lifting and peeling caused by the change in the dimension of the polarizing plate can be suppressed. More specifically, in FIG. 1, TAC film II 2' at the front face tends to contract or expand due to change in the humidity and the temperature. On the other hand, TAC film I 2 cannot not contract or expand easily since TAC film I is firmly adhered to the liquid crystal cell via the adhesive layer 3 and the adhesive layer cannot flexibly follow the change in the dimension. As the result, ray passing through TAC film I toward TAC film II cannot proceed straight. This causes undesirable phenomena such as leak of light.

To overcome the above problems, heretofore, a plasticizer is added to the adhesive so that the adhesive is flexible to a suitable degree and stress relaxation takes place. However, the adhesive containing a plasticizer has drawbacks in that the plasticizer bleeds out and that the adherend is stained with the plasticizer when the polarizing plate is peeled by the bleeding out. When a polyfunctional crosslinking agent having a functionality of three or greater is used in an adhesive, the number of crosslinks in the adhesive is decreased. However, the holding ability, i.e., the adhesion with the adherend, inevitably decreases in this case and problems such as lifting and peeling of the polarizing plate tend to arise with passage of the time.

Intensive studies on adhesive compositions exhibiting excellent stress relaxation without adding plasticizers have been made by the present inventors to overcome the above problems and it was found that excellent stress relaxation can be exhibited by using a copolymer of (meth)acrylic esters having a great molecular weight and an oligomer of (meth)acrylic esters having a small molecular weight in combination. However, when this adhesive composition is applied to a polarizing plate and the like, it was found that an undesirable phenomenon occasionally took place in that brightness was different at portions around the edges and at other portions of the polarizing plate.

Moreover, a problem takes place in the acrylic adhesive in that the molecular weight of the copolymer of (meth)acrylic esters decrease since degradation takes place under a condition of a high temperature and a high humidity although the degradation proceeds slowly. As the result, cohesive force in the adhesive becomes insufficient and lifting and peeling take place between a substrate such as a polarizing plate and a plate for phase differentiation and an adherend such as a plate of glass or polycarbonate.

SUMMARY OF THE INVENTION

Under the above circumstances, the present invention has a first object of providing an adhesive composition which suppresses degradation of easily hydrolyzable materials by hydrolysis and improves durability of the materials when the adhesive composition is applied to the materials; a second object of providing an adhesive composition which provides excellent stress relaxation without plasticizers, suppresses degradation of easily hydrolyzable materials by hydrolysis when the adhesive composition is applied to the materials, suppresses degradation of the composition itself and gives adhesive optical components having excellent quality; and a third object of providing an adhesive optical components such as a polarizing plate and a plate for phase differentiation which comprise a layer of the above adhesive composition.

As the result of intensive studies by the present inventors to achieve the above objects, it was found that the first object can be achieved with an adhesive composition comprising a copolymer of (meth)acrylic esters, a crosslinking agents and a phenol derivative, that the second object can be achieved with an adhesive composition comprising a copolymer of (meth)acrylic esters or, preferably, a mixture of a copolymer of (meth)acrylic esters and an oligomer of (meth)acrylic esters, a crosslinking agent, a radical scavenger and, optionally, a secondary antioxidant and that the third object can be achieved by disposing a layer comprising the adhesive composition obtained as described above at least on one face of an optical component.

The present invention has been completed based on the above knowledge.

The present invention provides:

(1) An adhesive composition which comprises (A) a copolymer of (meth)acrylic esters, (B) a crosslinking agent and (C) a phenol derivative (referred to as adhesive composition I, hereinafter);

(2) An adhesive optical component comprising an optical component and a layer which comprises adhesive composition I and is disposed at least on one face of the optical component (referred to as Adhesive optical component I, hereinafter);

(3) An adhesive composition which comprises (D) a copolymer of (meth)acrylic esters having a weight-average molecular weight of 500,000 to 2,500,000, (E) a crosslinking agent and (F) a radical scavenger (referred to as adhesive composition II, hereinafter);

(4) An adhesive composition which comprises (D') a mixture of a copolymer of (meth)acrylic esters having a weight-average molecular weight of 500,000 to 2,500,000 and an oligomer of (meth)acrylic esters having a weight-average molecular weight of 1,000 to 10,000 in amounts such that a ratio of the amounts by weight of the copolymer to the oligomer is in a range of 100:5 to 100:100, (E) a crosslinking agent and (F) a radical scavenger (referred to as adhesive composition II', hereinafter); and (5) An adhesive optical component comprising an optical component and a layer which comprises any of adhesive compositions II and II' and is disposed at least on one face of the optical component (referred to as Adhesive optical component II, hereinafter)

BRIEF DESCRIPTION OF THE DRAWINGS

In the figure, 1 means a polarizing plate made of polyvinyl alcohol, 2 means TAC film I, 2' means TAC film II, 3 means an adhesive layer, 4 means a release sheet, 5 means a film for protecting the surface and 10 means a polarizing plate.

DESCRIPTION OF THE PREFERRED EMBODIMENTS

Adhesive composition I of the present invention will be described in the following.

Adhesive composition I of the present invention comprises a copolymer of (meth)acrylic esters as component (A), a crosslinking agent as component (B) and a phenol derivative as component (C).

As the copolymer of (meth)acrylic esters of component (A), copolymers having portions for crosslinking which can be crosslinked with the crosslinking agent of component (B) are used. The copolymer of (meth)acrylic ester having such portions for crosslinking is not particularly limited. A copolymer can be suitably selected from copolymers of (meth)acrylic esters which are conventionally used as the resin component of adhesives.

Preferable examples of the copolymer of (meth)acrylic ester having such portions for crosslinking include copolymers of a (meth)acrylic ester in which the alkyl group in the ester portion has 1 to 20 carbon atoms, a monomer having a functional group having an active hydrogen and other monomers which are used where desired.

Examples of the copolymer of a (meth)acrylic ester in which the alkyl group in the ester portion has 1 to 20 carbon atoms include methyl (meth)acrylate, ethyl (meth)acrylate, propyl (meth)acrylate, butyl (meth)acrylate, pentyl (meth) acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth) acrylate, palmityl (meth)acrylate and stearyl (meth)acrylate. The copolymers of a (meth)acrylic ester may be used singly or in combination of two or more.

Examples of the monomer having a functional group having an active hydrogen include hydroxyalkyl esters of (meth)acrylic acid such as 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate and 4-hydroxybutyl (meth)acrylate; acrylamides such as acrylamide, methacrylamide, N-methylacrylamide, N-methylmethacrylamide, N-methylolacrylamide and N-methylol-methacrylamide; monoalkylaminoalkyl (meth)acrylates such as monomethylaminoethyl (meth)acrylate, monoethylaminoethyl (meth) acrylate, monomethylaminopropyl (meth)acrylate and monoethyl-aminopropyl (meth)acrylate; and ethylenically unsaturated carboxylic acids such as acrylic acid, methacrylic acid, crotonic acid, maleic acid, itaconic acid and citraconic acid. The above monomers may be used singly or in combination of two or more.

Examples of the other monomers which are used where desired include vinyl esters such as vinyl acetate and vinyl propionate; olefins such as ethylene, propylene and isobutylene; halogenated olefins such as vinyl chloride and vinylidene chloride; styrenic monomers such as styrene and a-methylstyrene; diene monomers such as butadiene, isoprene and chloroprene; nitrile monomers such as acrylonitrile and methacrylonitrile; and N,N-dialkylsubstituted acrylamides such as N,N-dimethylacrylamide and N,N-dimethylmethacrylamide. The above monomers may be used singly or in combination of two or more.

In adhesive composition I of the present invention, the structure of the copolymer of (meth)acrylic esters used as component (A) is not particularly limited and any of random copolymers, block copolymers and graft copolymers can be used. As for the molecular weight, it is preferable that the weight-average molecular weight is in the range of 500,000 to 2,500,000. When the weight-average molecular weight is smaller than 500,000, there is the possibility that adhesion and durability of adhesion with the adherend are insufficient. When the weight-average molecular weight exceeds 2,500,000, the property of following change in the dimension of the substrate may deteriorate. From the standpoint of adhesion, durability of adhesion and the property of following change in the dimension of the substrate, it is preferable that the weight-average molecular weight is 800,000 to 1,800,000 and more preferably 1,200,000 to 1,600,000.

The weight-average molecular weight described above is the weight-average molecular weight of the corresponding polystyrene obtained in accordance with the gel permeation chromatography (GPC).

In the present invention, the copolymer of (meth)acrylic esters of component (A) may be used singly or in combination of two or more. Where desired, homopolymers and copolymers of (meth)acrylic esters having a small molecular weight such as a weight-average molecular weight of 100,000 or smaller can be used in combination with the above copolymer of (meth)acrylic esters having a great molecular weight.

The crosslinking agent of component (B) in adhesive composition I of the present invention is not particularly limited. A compound can be suitably selected from crosslinking agents which are conventionally used in acrylic adhesives. Examples of the crosslinking agent include polyisocyanate compounds, epoxy resins, melamine resins, urea resins, dialdehydes and methylol polymers. In the present invention, polyisocyanate compounds are preferably used.

Examples of the polyisocyanate compound include aromatic polyisocyanates such as tolylene diisocyanate, diphenylmethane diisocyanate and xylylene diisocyanate; aliphatic polyisocyanates such as hexamethylene diisocyanate; alicyclic polyisocyanates such as isophorone diisocyanate and hydrogenated diphenylmethane diisocyanate; biuret compounds and isocyanurate compounds derived from the above polyisocyanates; and adduct compounds which are reaction products of the above polyisocyanates with low molecular weight compounds having an active hydrogen such as ethylene glycol, propylene glycol, neopentyl glycol, trimethylolpropane and castor oil.

In the present invention, the crosslinking agent of component (B) may be used singly or in combination of two or more. The amount is selected, in general, in the range of 0.001 to 50 parts by weight and preferably in the range of 0.01 to 10 parts by weight per 100 parts by weight of the copolymer of acrylic esters of component (A) although the amount may be different depending on the type of the crosslinking agent.

In adhesive composition I of the present invention, a phenol derivative is used as component (C). The phenol derivative is used for suppressing hydrolysis of the easily hydrolyzable material such as a film of acetylcellulose to which the adhesive composition of the present invention is applied.

As the phenol derivative, it is preferable that at least one compound is suitably selected, for example, from single ring phenol compounds, two-ring phenol compounds, three-ring phenol compounds and four-ring phenol compounds.

Examples of the phenol derivative include single ring phenol compounds such as 2,6-di-tert-butyl-p-cresol, butylhydroxyanisole and stearyl β-(3,5-di-tert-butyl-4-hydroxyphenyl)propionate; two-ring phenol compounds such as 4,4'-butylidenebis(3-methyl-6-tert-butylphenol) and 3,6-dioxaoctamethylenebis[3-(3-tert-butyl-4-hydroxy-5-methylphenyl) propionate]; three-ring phenol compounds such as 1,1,3-tris(2-methyl-4-hydroxy-5-tert-butylphenyl) butane; and four-ring phenol compounds such as tetrakis [methylene-3-(3',5'-di-tert-butyl-4'-hydroxyphenyl) propionate]-methane.

In the present invention, the amount of the phenol derivative of component (C) is selected, in general, in the range of 0.01 to 10 parts by weight per 100 parts by weight of the copolymer of (meth)acrylic esters of component (A). When the amount is less than 0.01 part by weight, there is the possibility that the effect of suppressing hydrolysis is not sufficiently exhibited and the object of the present invention is not achieved. When the amount exceeds 10 parts by weight, the effect of suppressing hydrolysis is not exhibited to the degree expected from the used amount. Moreover, economic disadvantage arises and physical properties of adhesion may be adversely affected. From the standpoint of the effect of suppressing hydrolysis, the physical properties of adhesion and the economy, it is preferable that the amount of the phenol derivative is in the range of 0.05 to 5 parts by weight and more preferably in the range of 0.1 to 2 parts by weight.

Adhesive composition I of the present invention may further comprise various additives conventionally used for adhesive compositions such as plasticizers, silane coupling agents and ultraviolet absorbents as long as the additives do not adversely affect the objects of the present invention, where desired.

When a silane coupling agent, among the above additives, is added to the adhesive composition, adhesion to a liquid crystal cell (glass) under a hot and humid condition is improved and lifting and peeling of the polarizing plate and the plate for phase differentiation are suppressed. As the silane coupling agent, organic silicon compounds which have at least one alkoxysilyl group in the molecule, are compatible with the components of the adhesive composition and transmit light are preferably used. For example, substantially transparent organic silicon compounds having these properties are used. Examples of the silane coupling agent include vinyltriethoxysilane, vinyltris(2-methoxyethoxy)silane, 3-methacryloxypropyltrimethoxysilane, γ-glycidoxypropyltrimethoxysilane, 2-(3,4-epoxycyclohexyl)ethyltrimethoxysilane, 3-aminopropyltriethoxysilane and N-phenyl-3-aminopropyltrimethoxysilane. It is preferable that the amount of the silane coupling agent is in the range of 0.001 to 10 parts by weight and more preferably in the range of 0.005 to 5 parts by weight per 100 parts by weight of the adhesive composition.

When adhesive composition I of the present invention having the above composition is applied to easily hydrolyzable materials, degradation of the materials by hydrolysis is suppressed and, in particular, durability under a high temperature and a high humidity can be improved. Therefore, adhesive composition I is advantageously applied to films of acetylcellulose which are easily hydrolyzed.

Adhesive compositions II and II' of the present invention will be described in the following.

In adhesive composition II, a copolymer of (meth)acrylic esters alone is used as component (D) and, in adhesive composition II', a mixture of a copolymer of (meth)acrylic esters and an oligomer of (meth)acrylic esters is used as component (D').

As the copolymer of (meth)acrylic esters of component (D), a copolymer of (meth)acrylic esters having portions for crosslinking which can be crosslinked with the crosslinking agent of component (E) is used. The copolymer of (meth)acrylic esters having portions for crosslinking is not particularly limited. A copolymer can be suitably selected from copolymers of (meth)acrylic esters which are conventionally used as the resin component of adhesive compositions.

Preferable examples of the copolymer of (meth)acrylic esters having portions for crosslinking include copolymers of a (meth)acrylic ester in which the alkyl group in the ester portion has 1 to 20 carbon atoms, a monomer having a functional group having an active hydrogen and other monomers which are used where desired.

Examples of the (meth)acrylic ester in which the alkyl group in the ester portion has 1 to 20 carbon atoms, the monomer having a functional group having an active hydrogen and the other monomers which are used where desired include the (meth)acrylic ester in which the alkyl group in the ester portion has 1 to 20 carbon atoms, the monomer having a functional group having an active hydrogen and the other monomers which are used where desired, respectively, which are described as the examples of the components for the copolymer of (meth)acrylic esters of component (A) used in adhesive composition I.

In adhesive composition II of the present invention, the structure of the copolymer of (meth)acrylic esters used as component (D) is not particularly limited and any of random copolymers, block copolymers and graft copolymers can be used. The weight-average molecular weight of the copolymer is selected in the range of 500,000 to 2,500,000. When the weight-average molecular weight is smaller than 500,000, there is the possibility that adhesion and durability of adhesion with the adherend are insufficient. When the weight-average molecular weight exceeds 2,500,000, the property of following change in the dimension of the substrate may deteriorate. From the standpoint of adhesion, durability of adhesion and the property of following change in the dimension of the substrate, it is preferable that the weight-average molecular weight is 800,000 to 1,800,000 and more preferably 1,200,000 to 1,600,000.

The weight-average molecular weight described above is the weight-average molecular weight of the corresponding polystyrene obtained in accordance with the gel permeation chromatography (GPC).

In the present invention, the copolymer of (meth)acrylic esters of component (D) may be used singly or in combination of two or more.

In adhesive composition II' of the present invention, a mixture of the copolymer of (meth)acrylic esters described above and an oligomer of (meth)acrylic esters can be used as component (D') so that stress relaxation is provided.

The oligomer of (meth)acrylic ester may be any oligomer selected from oligomers obtained by homopolymerizing one compound selected from (meth)acrylic esters in which the alkyl group in the ester portion has 1 to 20 carbon atoms, oligomers obtained by copolymerizing at least two compounds selected from the above (meth)acrylic esters and oligomers obtained by copolymerizing at least one compound selected from the above (meth)acrylic esters with other monomers.

Examples of the (meth)acrylic ester in which the alkyl group in the ester portion has 1 to 20 carbon atoms and the other monomers include the (meth)acrylic esters in which the alkyl group in the ester portion has 1 to 20 carbon atoms and the other monomers, respectively, which are described as the examples of the components for the copolymer of (meth)acrylic esters of component (A) used in adhesive composition I.

The weight-average molecular weight of the oligomer of (meth)acrylic esters is selected in the range of 1,000 to 10,000. When the molecular weight is smaller than 1,000, the oligomer bleeds out and there is the possibility that an adherend is stained when a substrate adhered to the adherend via the adhesive composition is removed. When the molecular weight exceeds 10,000, there is the possibility that the property of following change in the dimension of the substrate (stress relaxation) of the adhesive composition deteriorates. From the standpoint of preventing staining of the adherend and the property of following change in the dimension of the substrate, it is preferable that the weight-average molecular weight of the oligomer of (meth)acrylic esters is in the range of 3,000 to 10,000.

It is preferable that the oligomer of (meth)acrylic esters has a ratio of the weight-average molecular weight (Mw) to the number-average molecular weight (Mn) representing the molecular weight distribution of 2.0 or smaller. When the ratio Mw/Mn exceeds 2.0, there is the possibility that the oligomer contains components having excessively small molecular weights. Such components may cause bleeding out of the oligomer and staining of an adherend when a substrate adhered to the adherend via the adhesive composition is removed. It is more preferable that the ratio Mw/Mn is 1.7 or smaller.

The weight-average molecular weight and the number-average molecular weight described above are the weight-average molecular weight and the number-average molecular weight, respectively, of the corresponding polystyrene obtained in accordance with GPC.

In the present invention, the oligomer of (meth)acrylic esters may be used singly or in combination of two or more.

In adhesive composition II' of the present invention, the oligomer of (meth)acrylic esters is used in an amount of 5 to 100 parts by weight per 100 parts by weight of the above copolymer of (meth)acrylic esters. When the amount of the oligomer is less than 5 parts by weight, the property of following change in the dimension of the substrate (stress relaxation) becomes insufficient. When the amount of the oligomer exceeds 100 parts by weight, adhesion with the adherend becomes poor. From the standpoint of the property of following change in the dimension of the substrate and adhesion with the adherend, it is preferable that the amount of the oligomer is in the range of 10 to 70 parts by weight and more preferably in the range of 15 to 50 parts by weight.

In adhesive compositions II and II', the crosslinking agent of component (E) is not particularly limited. A crosslinking agent can be suitably selected from conventional crosslinking agents used for acrylic adhesives. Examples of the crosslinking agent include the compounds described as the examples of the crosslinking agent of component (B) in adhesive composition I.

In the present invention, the crosslinking agent of component (E) may be used singly or in combination of two or more. The amount of the crosslinking agent is selected, in general, in the range of 0.001 to 50 parts by weight and preferably in the range of 0.01 to 10 parts by weight per 100 parts by weight of the copolymer of (meth)acrylic esters of component (D) or the copolymer of (meth)acrylic esters in component (D') although the amount may be varied depending on the type of the crosslinking agent.

Adhesive compositions II and II' comprises a radical scavenger as component (F).

The radical scavenger is a compound which scavenges radicals generated by heat or light or with a heavy metal, suppresses initiation of chain reactions and inhibits chain reactions of the radicals. Since adhesive compositions II and II' of the present invention comprise the radical scavenger, the following effects are exhibited:

(1) When adhesive compositions II and II' are applied to an easily hydrolyzable material such as a film of acetyl cellulose, hydrolysis of the material is suppressed.

(2) Degradation of the adhesive itself is suppressed and, even when an optical component in which the adhesive composition of the present invention is used is left standing under a condition of a high temperature and a high humidity, lifting and peeling are not easily formed.

(3) When a copolymer of (meth)acrylic esters having a great molecular weight and an oligomer of (meth) acrylic esters having a small molecular weight are used in combination so that stress relaxation is exhibited, formation of uneven brightness can be suppressed in a polarizing plate to which the adhesive composition of the present invention is applied.

In the present invention, antioxidants, amine photostabilizers and polymerization inhibitors are preferably used as the radical scavenger.

As the antioxidant, phenolic antioxidants are preferable. Examples of the phenolic antioxidant include single ring phenol compounds such as 2,6-di-t-butyl-p-cresol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-4-ethyl-6-t-octylphenol, 2-isobutyl-4-ethyl-6-t-hexylphenol, 2-cyclohexyl-4-n-butyl-6-isopropylphenol, a mixed cresol modified with styrene, DL-$\alpha$-tocopherol and stearyl $\beta$-(3,5-di-t-butyl-4-hydroxyphenyl)propionate; two-ring phenol compounds such as 2,2'-methylenebis(4-methyl-6-t-butylphenol), 4,4'-butylidenebis(3-methyl-6-t-butylphenol), 4,4'-thiobis(3-methyl-6-t-butyl-phenol), 2,2'-thiobis(4-methyl-6-t-butylphenol), 4,4'-methylenebis(2,6-di-t-butylphenol), 2,2'-methylenebis [6-(1-methylcyclohexyl) -p-cresol], 2,2'-ethylidenebis(4,6-di-t-butylphenol), 2,2'-butylidenebis (2-t-butyl-4-methylphenol), 3,6-dioxaoctamethylenebis [3-(3-t-butyl-4-hydroxy-5-methylphenyl) propionate], triethyleneglycol bis [3-(3-t-butyl-5-methyl-4-hydroxyphenyl) propionate], 1,6-hexanediol bis[3-(3,5-di-t-butyl-4-hydroxyphenyl) propionate] and 2,2'-thiodiethylenebis [3-(3,5-di-t-butyl-4-hydroxyphenyl) propionate]; three ring phenol compounds such as 1,1,3-tris(2-methyl-4-hydroxy-5-t-butylphenyl) butane, 1,3,5-tris(2,6-dimethyl-3-hydroxy-4-t-butylbenzyl) isocyanurate, 1,3,5-tris[(3,5-di-t-butyl-4-hydroxy-phenyl) propionyloxyethyl] isocyanurate, tris(4-t-butyl-2,6-dimethyl-3-hydroxybenzyl) isocyanurate and 1,3,5-trimethyl-2,4,6-tris(3,5-di-t-butyl-4-hydroxybenzyl) benzene; four-ring phenol compounds such as tetrakis [methylene-3-(3,5-di-t-butyl-4-hydroxyphenyl) propionate] methane; and phenol compounds containing phosphorus such as bis(ethyl 3,5-di-t-butyl-4-hydroxybenzylphosphonate) potassium and bis(ethyl 3,5-di-t-butyl-4-hydroxybenzylphosphonate) nickel.

Examples of the amine photostabilizer include bis(2,2,6,6-tetramethyl-4-piperidyl) sebacate, polycondensates of dimethyl succinate and 1-(2-hydroxyethyl)-4-hydroxy-2,2,6,6-tetramethylpiperidine, tetrakis-(2,2,6,6-tetramethyl-4-piperidyl) 1,2,3,4-butanetetracarboxylate, 2,2,6,6-tetramethyl-4-piperidyl benzoate, bis(1,2,6,6-pentamethyl-4-piperidyl) 2-(3,5-di-t-butyl-4-hydroxybenzyl)-2-n-butyl malonate, bis(N-methyl-2,2,6,6-tetramethyl-4-piperidyl) sebacate, 1,1'-(1,2-ethandiyl)-bis(3,3,5,5-tetramethylpiperadinone), (mixed 2,2,6,6-tetramethyl-4-piperidyl/tridecyl) 1,2,3,4-butanetetracarboxylate, (mixed 1,2,2,6,6-pentamethyl-4-piperidyl/-tridecyl) 1,2,3,4-butanetetracarboxylate, mixed [2,2,6,6-tetramethyl-4-piperidyl/$\beta$,$\beta$,$\beta$',$\beta$'-tetramethyl-3,9-[2,4,8,10-tetraoxaspiro-(5,5)undecane]-diethyl] 1,2,3,4-butanetetracarboxylate, mixed [1,2,2,6,6-pentamethyl-4-piperidyl/$\beta$, $\beta$,$\beta$', $\beta$'-tetramethyl-3,9-[2,4,8,10-tetraoxaspiro-(5,5)undecane]-diethyl 1,2,3,4-butanetetracarboxylate, condensates of N,N'-bis(3-aminopropyl)ethylenediamine and 2,4-bis[N-butyl-N-(1,2,2,6,6-penta-methyl-4-piperidyl)amino]-6-chloro-1,3,5-triazine, poly[6-N-morpholyl-1,3,5-triazin-2,4-yl][(2,2,6,6-tetramethyl-4-piperidyl)imino]hexa-methylene[(2,2,6,6-tetramethyl-4-piperidyl)imide], condensates of N,N'-bis(2,2,6,6-tetramethyl-4-piperidyl)hexamethylenediamine and 1,2-dibromoethane and [N-(2,2,6,6-tetramethyl-4-piperidyl)-2-methyl-2-(2,2,6,6-tetramethyl-4-piperidyl) imino]propionamide.

The polymerization inhibitor is an agent conventionally used as the polymerization inhibitor in radical polymerization. Examples of the polymerization inhibitor include divalent phenolic polymerization inhibitors such as hydroquinone, p-methoquinone, t-butylhydroquinone and t-butylcatechol; and phenothiazine.

In the present invention, the radical scavenger of component (F) may be used singly or in combination of two or more. The amount of the radical scavenger is selected, in general, in the range of 0.01 to 10 parts by weight per 100 parts by weight of component (D) or component (D'). When the amount is less than 0.01 part by weight, there is the possibility that the effect of the radical scavenger is not sufficiently exhibited and the object of the present invention is not achieved. When the amount exceeds 10 parts by weight, the effect of the radical scavenger is not exhibited to the degree expected from the used amount. Moreover, economic disadvantage arises and physical properties of adhesion may be adversely affected. From the standpoint of the effect of the radical scavenger, the physical properties of adhesion and the economy, it is preferable that the amount of the radical scavenger is in the range of 0.05 to 5 parts by weight and more preferably in the range of 0.1 to 2 parts by weight.

When an antioxidant is used as the radical scavenger of component (F), a polymerizable antioxidant may be used in a manner such that the polymerizable antioxidant is copolymerized in the preparation of the copolymer of (meth) acrylic esters of component (D) or the copolymer of (meth) acrylic esters in component (D') so that the unit of the polymerizable antioxidant is incorporated into the prepared copolymer. In this case, the content of the unit of the polymerizable antioxidant is selected, in general, in the range of 0.01 to 10 parts by weight, preferably in the range of 0.05 to 5 parts by weight and most preferably in the range of 0.1 to 2 parts by weight per 100 parts by weight of the total amount of component (D) or component (D'). By incorporating the polymerizable antioxidant into the copolymer, the antioxidant does not easily vaporize and an adhesive composition exhibiting excellent durability can be obtained.

Examples of the polymerizable antioxidant include compounds (a), (b) and (c) having the following structures:

Compound (a) and compound (b) are commercially available as "SUMILIZER GM" [manufactured by SUMITOMO KAGAKU KOGYO Co., Ltd.] and "SUMILIZER GS" [manufactured by SUMITOMO KAGAKU KOGYO Co., Ltd.], respectively.

In adhesive compositions II and II', a secondary antioxidant may be used as component (G) in combination with the radical scavenger of component (F). When the radical scavenger is used alone, there is the possibility that the radical scavenger itself causes coloring. The secondary antioxidant is used to suppress the coloring.

Examples of the secondary antioxidant include antioxidants containing phosphorus and antioxidants containing sulfur.

Examples of the antioxidant containing phosphorus include trioctyl phosphite, trilauryl phosphite, tristridecyl phosphite, trisisodecyl phosphite, phenyl diisooctyl phosphite, phenyl diisodecyl phosphite, phenyl di(tridecyl) phosphite, diphenyl isooctyl phosphite, diphenyl isodecyl phosphite, diphenyl tridecyl phosphite, triphenyl phosphite, tris(nonylphenyl) phosphite, tris(2,4-di-t-butylphenyl) phosphite, tris(butoxyethyl) phosphite, tetratridecyl 4,4'-butylidenebis(3-methyl-6-t-butylphenol) diphosphite, 4,4'-isopropylidenediphenol alkyl phosphites (the alkyl group having about 12 to 15 carbon atoms), 4,4'-isopropylidenebis (2-t-butylphenol) di(nonylphenyl) phosphite, tris(biphenyl) phosphite, tetra(tridecyl) 1,1,3-tris(2-methyl-5-t-butyl-4-hydroxyphenyl)butane diphosphite, tris(3,5-di-t-butyl-4-hydroxyphenyl) phosphite, hydrogenated 4,4'-isopropylidenediphenol polyphosphite, bis(octylphenyl) bis [4,4'-butylidenebis(3-methyl-6-t-butylphenol)] 1,6-hexanediol diphosphite, hexatridecyl 1,1,3-tris(2-methyl-4-hydroxy-5-t-butylphenol) diphosphite, tris[4,4'-isopropylidenebis(2-t-butylphenol)] phosphite, tris(1,3-distearoyloxyisopropyl) phosphite, 9,10-dihydro-9-phosphaphenanthrene-10-oxide, tetrakis(2,4-di-t-butylphenyl)-4,4'-biphenylene diphosphonite, distearyl pentaerythritol diphosphite, i(nonylphenyl) pentaerythritol diphosphite, phenyl 4,4,'-isopropylidenediphenol pentaerythritol diphosphite, bis(2,4-di-t-butylphenyl) pentaerythritol diphosphite, bis(2,6-di-t-butyl-4-methylphenyl) pentaerythritol diphosphite and phenylbisphenol-A pentaerythritol diphosphite.

As the antioxidant containing sulfur, it is preferable that dialkyl thiodipropionates and esters of alkylthiopropionic acids with polyhydric alcohols are used. As the dialkyl thiodipropionates, dialkyl thiodipropionates having alkyl groups having 6 to 20 carbon atoms are preferable. As the esters of alkylthiopropionic acids with polyhydric alcohols, esters of alkylthiopropionic having an alkyl group having 4 to 20 carbon atoms with polyhydric alcohols are preferable. In this case, examples of the polyhydric alcohol for forming the ester of a polyhydric alcohol include glycerol, trimethylolethane, trimethylolpropane, pentaerythritol and trishydroxyethyl isocyanurate.

Examples of the dialkyl thiodipropionate include dilauryl thiodipropionate, dimyristyl thiodipropionate and distearyl thiodipropionate. Examples of the ester of an alkylthiopropionic acid with a polyhydric alcohol include glycerol tributylthiopropionate, glycerol trioctylthiopropionate, glycerol trilaurylthiopropionate, glycerol tristearylthiopropionate, trimethylolethane tributylthiopropionate, trimethylolethane trioctylthiopropionate, trimethylethane trilaurylthiopropionate, trimethylolethane tristearylthiopropionate, pentaerythritol tetrabutylthiopropionate, pentaerythritol tetraoctyl-thiopropionate, pentaerythritol tetralaurylthiopropionate and pentaerythritol tetrastearylthiopropionate.

In the present invention, the secondary antioxidant may be used singly or in combination of two or more. The amount of the secondary antioxidant is selected, in general, in the range of 0.1 to 10 parts by weight per 1 part by weight of the radical scavenger of component (F). When the amount is less than 0.1 part by weight, there is the possibility that the effect of suppressing coloring is not sufficiently exhibited. When the amount exceeds 10 parts by weight, the effect of the secondary antioxidant is not exhibited to the degree expected from the used amount. Moreover, economic disadvantage arises and physical properties of adhesion may be adversely affected. From the standpoint of the effect of suppressing coloring, the physical properties of adhesion and the economy, it is preferable that the amount of the radical scavenger is in the range of 0.5 to 5 parts by weight and more preferably in the range of 1 to 2 parts by weight per 1 part by weight of the radical scavenger.

The adhesive compositions II and II' of the present invention may further comprise various additives conventionally used for adhesive compositions such as plasticizers, silane coupling agents and ultraviolet light absorbents as long as the objects of the present invention are not adversely affected, where desired, When adhesive compositions II and II' of the present invention having the above compositions are applied to easily hydrolyzable materials, degradation of the materials by hydrolysis is suppressed and, in particular, durability under the environment of a high temperature and a high humidity can be improved. Therefore, it is advantageous that the adhesive compositions of the present invention are applied to films of acetyl cellulose which are easily hydrolyzed.

When adhesive compositions I, II and II' are used for optical components, it is advantageous that the compositions transmit light.

In the present invention, a layer comprising any of adhesive compositions I, II and II' (referred occasionally to as an adhesive layer, hereinafter) can be disposed at least on one face of a substrate and the obtained laminate can be used as an adhesive sheet. Examples of the substrate include paper substrates such as glassine paper, coated paper and cast paper; laminate papers obtained by laminating thermoplastic resins such as polyethylene on the paper substrates; polyester films such as films of polyethylene terephthalate, polybutylene phthalate and polyethylene naphthalate; polyolefin films such as films of polypropylene and polymethylpentene; plastic films such as films of polycarbonate and cellulose acetate; and laminate sheets containing these films. The substrate is suitably selected in accordance with the application of the adhesive sheet.

The above adhesive sheet can be used for transferring the adhesive layer to an adherend or as a component stuck to a desired adherend. When the adhesive sheet is used in the former application, in general, a substrate sheet is coated with a release agent such as a silicone resin. In this case, the thickness of the substrate sheet is not particularly limited. In general, the thickness is 20 to 150 μm.

When the adhesive sheet is used in the latter application, the type and the thickness of the substrate are suitably selected in accordance with the application. A conventional release sheet may be disposed on the adhesive layer, where desired.

In the above adhesive sheets, the thickness of the adhesive layer is, in general, about 5 to 150 μm and preferably about 10 to 90 μm.

The adhesive optical components I and II of the present invention comprises an optical component and a layer which comprises any of adhesive compositions I, II and II' and is disposed at least on one face of the optical component.

Preferable examples of the above optical component include polarizing plates and plates for phase differentiation each having a TAC film. Examples of the above polarizing plates include polarizing plates used for liquid crystal display apparatuses, for adjustment of quantity of light, for apparatuses using interference of polarized light and for optical detectors of defects.

As the application of adhesive optical components I and II of the present invention, in particular, it is preferable that the layers comprising adhesive compositions I, II and II' are disposed on polarizing plates and plates for phase differentiation for liquid crystal cells in liquid crystal display apparatuses.

When the adhesive composition I of the present invention is applied to easily hydrolyzable materials, degradation of the materials by hydrolysis can be suppressed and durability can be improved. Therefore, when the adhesive composition is applied to polarizing plates and plates for phase differentiation for liquid crystal cells, hydrolysis of the TAC film disposed in the plates is suppressed and, in particular, durability under the environment of a high temperature and a high humidity can be improved.

Adhesive compositions II and II' provide excellent stress relaxation without plasticizers. Moreover, when the compositions are applied to easily hydrolyzable materials, adhesive optical components having excellent qualities can be provided since degradation of the materials by hydrolysis can be suppressed and degradation of the adhesive compositions themselves can also be suppressed.

EXAMPLES

The present invention will be described more specifically with reference to examples in the following. However, the present invention is not limited to the examples.

Example 1

Into 200 parts by weight of toluene, 100 parts by weight of a copolymer of acrylic esters having a weight-average molecular weight of 1,200,000 (the unit of butyl acrylate: 97% by weight and the unit of acrylic acid: 3% by weight), 0.05 parts by weight of an adduct of trimethylpropane and tolylene diisocyanate as the crosslinking agent and 0.5 parts by weight of 2,6-di-tert-butyl-p-cresol as the phenol derivative were added and a solution of an adhesive was prepared.

A substrate of a polyethylene terephthalate film having a thickness of 38 μm which was coated with a silicone resin on one face [manufactured by LINTEC Corporation; the trade name: SP PET38] was coated with the solution of an adhesive prepared above on the face coated with a silicone resin. The substrate coated with the solution of an adhesive was dried at 100° C. for 1 minute and an adhesive sheet having an adhesive layer having a thickness of 30 μm was prepared.

The prepared adhesive sheet was laminated to one face of a TAC film having a thickness of 80 μm in a manner such that the adhesive layer was attached to the TAC film. The obtained laminate was aged at the ordinary temperature for one week and an adhesive optical component having a length of 80 mm and a width of 150 mm was prepared.

The substrate on the adhesive optical component prepared above was removed and the remaining adhesive optical component was stuck to a glass substrate via the exposed adhesive layer.

The obtained product was subjected to the durability tests under the condition of a high temperature and under the condition of a high temperature and a high humidity shown below and the properties were evaluated. No degradation of the TAC film was confirmed. No lifting or peeling from the glass substrate was found.

Evaluation of the Properties of the Optical Component

The durability tests were conducted under a condition of a high temperature of 100° C. and dry and under a condition of a high temperature of 80° C. and a high humidity of 90% RH. The degradation of the TAC film (turbidity and coloring) and lifting and peeling from the glass substrate were visually observed and the properties of the optical component were evaluated.

Examples 2 to 7

Optical components were prepared and the properties were evaluated in accordance with the same procedures as those conducted in Example 1 except that compounds shown in Table 1 were used in amounts shown in Table 1 as the phenol derivative in place of 2,6-di-tert-butyl-p-cresol. The results are shown in Table 1.

In Table 1, the phenol derivatives are abbreviated as shown in the following:

C-1: butylhydroxyanisole
C-2: stearyl β-(3,5-di-tert-butyl-4-hydroxyphenyl) propionate
C-3: 4,4'-butylidenebis(3-methyl-6-tert-butylphenol)
C-4: 3,6-dioxaoctamethylenebis [3-(3-tert-butyl-4-hydroxy-5-methylphenyl) propionate]
C-5: 1,1,3-tris(2-methyl-4-hydroxy-5-tert-butylphenyl) butane C-6: tetrakis [methylene-3-(3',5'-di-tert-butyl-4'-hydroxyphenyl) propionate]methane

TABLE 1

| | Phenol derivative | | Evaluation of properties | |
|---|---|---|---|---|
| | type | amount (part by wt.) | high temperature | high temperature and high humidity |
| Example 2 | C-1 | 1.5 | good | good |
| Example 3 | C-2 | 2.0 | good | good |
| Example 4 | C-3 | 0.5 | good | good |
| Example 5 | C-4 | 0.5 | good | good |

TABLE 1-continued

| | Phenol derivative | | Evaluation of properties | |
|---|---|---|---|---|
| | type | amount (part by wt.) | high temperature | high temperature and high humidity |
| Example 6 | C-5 | 0.5 | good | good |
| Example 7 | C-6 | 0.5 | good | good |

Note:
good means that no degradation of a TAC film was confirmed and no lifting or peeling from a glass substrate was formed.

Example 8

Into 300 parts by weight of toluene, 100 parts by weight of the copolymer of acrylic esters which was used in Example 1, 50 parts by weight of a homopolymer of butyl acrylate having a weight-average molecular weight of 50,000, 0.05 parts by weight of an adduct of trimethylpropane and tolylene diisocyanate as the crosslinking agent and 0.5 parts by weight of 2,6-di-tert-butyl-p-cresol as the phenol derivative were added and a solution of an adhesive was prepared.

Subsequently, the same procedures as those conducted in Example 1 were conducted. Under the condition of a high temperature and a high humidity, no degradation of the TAC film was confirmed and no lifting or peeling from the glass substrate was found.

Example 9

A solution of an adhesive was prepared in accordance with the same procedures as those conducted in Example 1 except that 0.05 parts by weight of γ-glycidoxypropyltrimethoxysilane, which is a silane coupling agent, was further added.

Subsequently, the same procedures as those conducted in Example 1 were conducted. Under the condition of a high temperature and a high humidity, no degradation of the TAC film was confirmed and no lifting or peeling from the glass substrate was found.

Comparative Example 1

The same procedures as those conducted in Example 1 were conducted except that 2,6-di-tert-butyl-p-cresol was not added. In the durability tests under the condition of a high temperature and under the condition of a high temperature and a high humidity, the TAC film became turbid under the condition of a high temperature and a high humidity and peeling from the glass substrate took place under the condition of a high humidity.

Example 10

Into 200 parts by weight of toluene, 100 parts by weight of a copolymer of acrylic esters having a weight-average molecular weight of 1,200,000 (the unit of butyl acrylate: 97% by weight and the unit of acrylic acid: 3% by weight), 0.05 parts by weight of an adduct of trimethylpropane and modified tolylene diisocyanate as the crosslinking agent and 0.1 part by weight of 2,6-di-tert-butyl-p-cresol as the radical scavenger of a phenolic antioxidant were added and a solution of an adhesive was prepared.

A release sheet of a polyethylene terephthalate film having a thickness of 38 μm which was coated with a silicone resin on one face [manufactured by LINTEC Corporation; the trade name: SP PET38] was coated with the solution of an adhesive prepared above on the face coated with a silicone resin. The release sheet coated with the solution of an adhesive prepared above was dried at 100° C. for 1 minute and an adhesive sheet having an adhesive layer having a thickness of 30 μm was prepared.

The prepared adhesive sheet was laminated to one face of a polarizing plate having a three-layer laminate structure composed of a film of triacetylcellulose, a film of polyvinyl alcohol and a film of triacetylcellulose laminated in this order in a manner such that the layer of the adhesive was attached to the polarizing plate. The obtained laminate was aged at the ordinary temperature for one week and an adhesive optical component having a length of 80 mm and a width of 150 mm was prepared.

The release sheet on the adhesive optical component prepared above was removed and the remaining adhesive optical component was stuck to both faces of a glass plate for a liquid crystal cell via the exposed adhesive layer so that an orthogonal Nicol was formed.

The properties of the obtained optical component was evaluated in accordance with the methods described in the following. The results of the evaluation are shown in Table 2.

Evaluation of the Properties of the Optical Component

The durability tests were conducted under the condition of a high temperature of 100° C. and dry for 1,000 hours and under the condition of a high temperature of 80° C. and a high humidity of 90% RH for 1,000 hours. The results were evaluated as follows:
(1) Resistance of a TAC film to hydrolysis The condition of degradation (turbidity and coloring) of a TAC film was evaluated by visual observation. When no lifting or peeling was found, the resistance to hydrolysis was evaluated as good. When lifting and peeling were found, the resistance to hydrolysis was evaluated as poor.
(2) Durability (resistance of an adhesive to degradation)

The presence or the absence of lifting and peeling of an optical component from a glass plate was visually observed. When no lifting or peeling was found, the durability was evaluated as good. When lifting and peeling were found, the durability was evaluated as poor.
(3) Effect of suppressing difference in brightness Difference in brightness at peripheral portions and at inner portions (the picture frame phenomenon) of a polarizing plate was visually observed. When no picture frame phenomenon, i.e., no difference in brightness, was found, the effect of suppressing difference in brightness was evaluated as good. When the picture frame phenomenon, i.e., the difference in brightness, was found, the effect of suppressing difference in brightness was evaluated as poor.
(4) Resistance to coloring of an adhesive An adhesive layer was formed on a polarizing plate and the resultant laminate was stuck to a glass plate. The obtained optical component was placed under the condition of a high temperature of 100° C. and dry for 1,000 hours or under the condition of a high temperature of 80° C. and a high humidity of 90% RH for 1,000 hours. The change in color of the optical component was obtained by the measurement of the degree of yellowing (b*) and the degree of redding (c*) in accordance with the method of Japanese Industrial Standard K 7103 using a color difference meter [manufactured by NIPPON DENSHOKU Co., Ltd.; SQ-2000]. The resistance to coloring was evaluated in accordance with the following criteria:

good: a change smaller than 0.5
fair: a change of 0.5 or greater and smaller than 1.0
poor: a change of 1.0 or greater Example 11

An optical component was prepared and evaluated in accordance with the same procedures as those conducted in Example 10 except that 0.1 part by weight of an antioxidant containing phosphorus which was a 4,4'-isopropylidenediphenol alkyl phosphite [manufactured by ASAHI DENKA KOGYO Co., Ltd.; the trade name: ADEKASTAB 1500] was further added as the secondary antioxidant. The results are shown in Table 2.

Example 12

An optical component was prepared and evaluated in accordance with the same procedures as those conducted in Example 10 except that 25 parts by weight of a homooligomer of butyl acrylate having a weight average molecular weight of 4,000 (Mw/Mn=1.5) and 0.05 parts by weight of the antioxidant containing phosphorus used in Example 11 [ADEKASTAB 1500] were further added. The results are shown in Table 2.

Example 13

An optical component was prepared and evaluated in accordance with the same procedures as those conducted in Example 12 except that 0.05 parts by weight of an antioxidant containing sulfur which was dimyristyl thiodipropionate [manufactured by ASAHI DENKA KOGYO Co., Ltd.; the trade name: ADEKASTAB AO-503A] was used in place of the antioxidant containing phosphorus "ADEKASTAB 1500". The results are shown in Table 2.

Example 14

An optical component was prepared and evaluated in accordance with the same procedures as those conducted in Example 10 except that 25 parts by weight of a homooligomer of butyl acrylate having a weight-average molecular weight of 10,000 (Mw/Mn=1.6) was further added and 0.1 part by weight of a phenolic antioxidant [manufactured by SUMITOMO KAGAKU KOGYO Co., Ltd.; the trade name: SUMILIZER GS] was used in place of 0.1 part by weight of 2,6-di-t-butyl-p-cresol. The results are shown in Table 2.

Example 15

An optical component was prepared and evaluated in accordance with the same procedures as those conducted in Example 14 except that 0.05 parts by weight of an amine photostabilizer which was tetrakis(2,2,6,6-tetramethyl-4-piperidyl) 1,2,3,4-butanetetracarboxylate [manufactured by ASAHI DENKA KOGYO Co., Ltd.; the trade name: ADEKASTAB LA-57] was used in place of 0.1 part by weight of the phenolic antioxidant "SUMILIZER GS". The results are shown in Table 2.

Example 16

An optical component was prepared and evaluated in accordance with the same procedures as those conducted in Example 15 except that 0.05 parts by weight of an antioxidant containing phosphorus which was bis(2,6-di-t-butyl-4-methylphenyl) pentaerythritol diphosphite [manufactured by ASAHI DENKA KOGYO Co., Ltd.; the trade name: ADEKASTAB PEP-36] was further added. The results are shown in Table 2.

Example 17

An optical component was prepared and evaluated in accordance with the same procedures as those conducted in Example 10 using 100 parts by weight of a copolymer of acrylic esters having a weight-average molecular weight of 1,200,000 (the unit of butyl acrylate: 96.9% by weight, the unit of acrylic acid: 3% by weight and the unit of a polymerizable phenolic antioxidant [manufactured by SUMITOMO KAGAKU KOGYO Co., Ltd.; the trade name: SUMILIZER GM]: 0.1% by weight), 25 parts by weight of a homooligomer of butyl acrylate having a weight-average molecular weight of 10,000, 0.05 parts by weight of an adduct of trimethylolpropane and modified tolylene diisocyanate and 0.05 parts by weight of the antioxidant containing phosphorus "ADEKASTAB 1500" which was used above. The results are shown in Table 2.

Example 18

An optical component was prepared and evaluated in accordance with the same procedures as those conducted in Example 10 except that 0.5 parts by weight of hydroquinone which was a polymerization inhibitor was used in place of 0.1 part by weight of 2,6-di-t-butyl-p-cresol. The results are shown in Table 2.

Comparative Example 2

An optical component was prepared and evaluated in accordance with the same procedures as those conducted in Example 10 except that 2,6-di-t-butyl-p-cresol was not used. The results are shown in Table 2.

Comparative Example 3

An optical component was prepared and evaluated in accordance with the same procedures as those conducted in Example 12 except that either 2,6-di-t-butyl-p-cresol or the antioxidant containing phosphorus "ADEKASTAB 1500" was not used. The results are shown in Table 2.

TABLE 2

| | Evaluation of properties of optical component | | | |
|---|---|---|---|---|
| | resistance to hydrolysis of TAC film | durability | effect of suppressing difference in brightness | resistance to coloring of adhesive |
| Example 10 | good | good | good | fair |
| Example 11 | good | good | good | good |
| Example 12 | good | good | good | good |
| Example 13 | good | good | good | good |
| Example 14 | good | good | good | good |
| Example 15 | good | good | good | fair |
| Example 16 | good | good | good | good |
| Example 17 | good | good | good | good |
| Example 18 | good | good | good | fair |
| Comparative Example 2 | poor | poor | good | good |
| Comparative Example 3 | poor | poor | poor | good |

In Examples 10 to 18, the resistance to hydrolysis of a TAC film, the durability and the effect of suppressing difference in brightness were good. In Examples 11 to 14, 16 and 17, the resistance to coloring of an adhesive was good. In Example 14, although the phenolic antioxidant was used alone without secondary antioxidants, the resistance to coloring of an adhesive was good since the specific antioxidant causing little coloring was used. In Example 17, the polymerizable antioxidant was used as the phenolic antioxidant and introduced into the copolymer of acrylic esters by copolymerization. The optical component exhibiting excellent properties could be obtained.

In contrast, in Comparative Examples 2 and 3, hydrolysis of the TAC film took place and coloring of the film was observed since no antioxidants were added. Portions of the adhesive optical component were peeled from the glass plate. In Comparative Example 3, the difference in brightness was found in the polarizing plate.

What is claimed is:

1. An adhesive composition which comprises a crosslinkable product of (A) a copolymer of (meth)acrylic esters and (B) a crosslinking agent, and (C) at least one phenol compound selected from the group consisting of 2,6-di-tert-butyl-p-cresol, butylhydroxyanisole, stearyl β-(3,5-di-tert-butyl-4-hydroxyphenyl)propionate, 4,4'-butylidenebis (3-methyl-6-tert-butylphenol), 3,6-dioxaoctamethylenebis [3-(3-tert-butyl-4-hydroxy-5-methylphenyl)propionate], and 1,1,3-tris(2-methyl-4-hydroxy-5-tert-butylphenyl) butane, wherein the crosslinking agent (B) is in an amount of 0.001 to 50 parts by weight per 100 parts by weight of the copolymer (A).

2. An adhesive composition according to claim 1, which comprises 0.01 to 10 parts by weight of the phenol compound (C) per 100 parts by weight of copolymer (A).

3. An adhesive composition which comprises a crosslinkable product of components which comprises (D) a copolymer of (meth)acrylic esters having a weight-average molecular weight of 500,000 to 2,500,000 and (E) a crosslinking agent, and (F) a radical scavenger, wherein the crosslinking agent (E) is in an amount of 0.001 to 50 parts by weight per 100 parts by weight of the copolymer(D), and the radical scavenger (F) is in an amount of 0.01 to 10 parts by weight per 100 parts by weight of the copolymer (D).

4. An adhesive composition which comprises a crosslinkable product of (D') a mixture of a copolymer of (meth) acrylic esters having a weight-average molecular weight of 500,000 to 2,500,000 and an oligomer of (meth) acrylic esters having a weight-average molecular weight of 1,000 to 10,000 in amounts such that a ratio of the amounts by weight of the copolymer to the oligomer is 100:5 to 100:100 and (E) a crosslinking agent, and (F) a radical scavenger, wherein the crosslinking agent (E) is in an amount of 0.001 to 50 parts by weight per 100 parts by weight of the mixture (D') and the radical scavenger (F) is in an amount of 0.01 to 10 parts by weight per 100 parts by weight of the mixture (D').

5. An adhesive composition according to claim 3, which further comprises (G) a secondary antioxidant.

6. An adhesive composition according to claim 4, which further comprises (G) a secondary antioxidant.

7. An adhesive composition according to claim 5, which comprises 0.1 to 10 parts by weight of the secondary antioxidant (G) per 1 part by weight of the radical scavenger (F).

8. An adhesive composition according to claim 6, which comprises 0.1 to 10 parts by weight of the secondary antioxidant (G) per 1 part by weight of the radical scavenger (F).

9. An adhesive composition according to claim 3, wherein the radical scavenger is at least one agent selected from the group consisting of an antioxidant, an amine photostabilizer and a polymerization inhibitor.

10. An adhesive composition according to claim 4, wherein the radical scavenger is at least one agent selected from the group consisting of an antioxidant, an amine photostabilizer and a polymerization inhibitor.

11. In an optical component, the improvement comprising the optical component containing the adhesive composition according to claim 3.

12. In an optical component, the improvement comprising the optical component containing the adhesive composition according to claim 4.

13. An adhesive composition according to claim 1, wherein the copolymer of (meth)acrylic esters (A) is a copolymer of (a) at least one monomer selected from the group consisting of methyl (meth)acrylate, ethyl (meth)acrylate, propyl (meth) acrylate, butyl (meth) acrylate, pentyl (meth) acrylate, hexyl (meth) acrylate and cyclohexyl (meth)acrylate and (b) at least one monomer selected from the group consisting of 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl (meth)acrylate, 4-hydroxybutyl(meth)acrylate, acrylamide, methacrylamide, N-methylacrylamide, N-methylmethacrylamide, N-methylolacrylamide, N-methylol-methacrylamide, monomethylaminoethyl (meth)acrylate, monoethylaminoethyl(meth)acrylate, onomethylaminopropyl-(meth)acrylate, monethyl-aminopropyl(meth)acrylate, acrylic acid, methacrylic acid, crotonic acid, maleic acid, itaconic acid and citraconic acid.

14. An adhesive composition according to claim 13, wherein the crosslinking agent (B) is a polyisocyanate compound.

15. An adhesive composition according to claim 14, wherein the phenol compound (C) is selected from the group consisting of 2,6-di-tert-butyl-p-cresol and 4,4'-butylidenebis(3-methyl-6-tert-butylphenol).

* * * * *

UNITED STATES PATENT AND TRADEMARK OFFICE
CERTIFICATE OF CORRECTION

PATENT NO. : 6,720,375 B2
APPLICATION NO. : 09/829061
DATED : April 13, 2004
INVENTOR(S) : Takashi Suzuki et al.

It is certified that error appears in the above-identified patent and that said Letters Patent is hereby corrected as shown below:

Col. 14, line 59, replace "trimethylpropane" with --trimethylolpropane--;

Col. 16, line 21 and 22, replace "trimethylpropane" with --trimethylolpropane--;

Col. 16, line 61, replace "trimethylpropane" with --trimethylolpropane-- .

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,720,375 B2 |
| APPLICATION NO. | : 09/829061 |
| DATED | : April 13, 2004 |
| INVENTOR(S) | : Takashi Suzuki et al. |

It is certified that error appears in the above-identified patent and that said Letters Patent is hereby corrected as shown below:

Col. 14, line 59, replace "trimethylpropane" with --trimethylolpropane--;

Col. 16, lines 21 and 22, replace "trimethylpropane" with --trimethylolpropane--;

Col. 16, line 61, replace "trimethylpropane" with --trimethylolpropane--.

Signed and Sealed this

Second Day of October, 2007

JON W. DUDAS
*Director of the United States Patent and Trademark Office*